US012150502B2

(12) United States Patent
Duffy

(10) Patent No.: US 12,150,502 B2
(45) Date of Patent: Nov. 26, 2024

(54) RESPIRATOR INCLUDING TRANSVERSELY-EXTENDING PLEAT AND METHOD OF FORMING SAME

(71) Applicant: 3M INNOVATIVE PROPERTIES COMPANY, St. Paul, MN (US)

(72) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 260 days.

(21) Appl. No.: 16/957,117

(22) PCT Filed: Dec. 27, 2018

(86) PCT No.: PCT/IB2018/060663

§ 371 (c)(1),
(2) Date: Jun. 23, 2020

(87) PCT Pub. No.: WO2019/135150

PCT Pub. Date: Jul. 11, 2019

(65) Prior Publication Data

US 2020/0390167 A1 Dec. 17, 2020

Related U.S. Application Data

(60) Provisional application No. 62/613,245, filed on Jan. 3, 2018.

(51) Int. Cl.
*A41D 13/11* (2006.01)
*A41H 43/00* (2006.01)
(Continued)

(52) U.S. Cl.
CPC ........ *A41D 13/1115* (2013.01); *A41D 13/113* (2013.01); *A41D 13/1161* (2013.01);
(Continued)

(58) Field of Classification Search
CPC ........................ A41D 13/11–1192; A41H 3/00; A62B 18/00; A62B 18/02; A62B 18/025; A62B 18/08; A62B 18/084; A62B 23/00–025
See application file for complete search history.

(56) References Cited

U.S. PATENT DOCUMENTS 3,613,678 A * 10/1971 Mayhew ............ A41D 13/1115 128/206.19
3,971,369 A * 7/1976 Aspelin .............. A41D 13/1115 128/206.19
(Continued)

FOREIGN PATENT DOCUMENTS

CN 101816466 1/2012
CN 202151126 2/2012
(Continued)

OTHER PUBLICATIONS

Davies, "The Separation of Airborne Dust Particles", Institution of Mechanical Engineers, London, Proceedings 1B, 1952, pp. 185-213.
(Continued)

*Primary Examiner* — Michelle J Lee

(57) ABSTRACT

Various embodiments of a respirator and a method of making such respirator are disclosed. The respirator includes a mask body and a harness connected to the mask body. The mask body includes a filtering structure having a central panel, an upper panel separated from the central panel by a first line of demarcation, and a lower panel separated from the central panel by a second line of demarcation. The mask body further includes a bisecting fold, and a transversely-extending three-layer pleat disposed in a central panel of a filtering structure of the mask body. The transversely-extending three-layer pleat is formed in the mask body and is
(Continued)

sealed to itself at a first seal location disposed on a right side of the mask body and a second seal location disposed on a left side of the mask body.

30 Claims, 5 Drawing Sheets

(51) Int. Cl.
*A62B 18/02* (2006.01)
*A62B 18/08* (2006.01)
*A62B 23/02* (2006.01)

(52) U.S. Cl.
CPC ............. *A41H 43/00* (2013.01); *A62B 18/02* (2013.01); *A62B 18/084* (2013.01); *A62B 23/025* (2013.01)

(56) References Cited

U.S. PATENT DOCUMENTS 3,971,373 A 7/1976 Braun
4,215,682 A 8/1980 Kubik
4,300,549 A * 11/1981 Parker ................ A41D 13/1115 128/206.19
RE31,285 E 6/1983 Van Turnhout
4,536,440 A 8/1985 Berg
4,588,537 A 5/1986 Klasse
4,606,341 A 8/1986 Hubbard
4,688,566 A 8/1987 Boyce
4,790,306 A 12/1988 Braun
4,798,850 A 1/1989 Brown
4,807,619 A 2/1989 Dyrud
5,237,986 A 8/1993 Seppala
5,325,892 A 7/1994 Japuntich
5,394,568 A 3/1995 Brostrom
5,481,763 A 1/1996 Brostrom
5,496,507 A 3/1996 Angadjivand
5,656,368 A 8/1997 Braun
5,699,791 A * 12/1997 Sukiennik .......... A41D 13/1161 128/206.13
5,701,893 A 12/1997 Kern
5,804,295 A 9/1998 Braun
5,908,598 A 6/1999 Rousseau
6,041,782 A 3/2000 Angadjivand
6,123,077 A 9/2000 Bostock
6,234,171 B1 5/2001 Springett
D449,377 S 10/2001 Henderson
6,332,465 B1 12/2001 Xue
6,375,886 B1 4/2002 Angadjivand
6,394,090 B1 5/2002 Chen
6,397,458 B1 6/2002 Jones
6,398,847 B1 6/2002 Jones
6,406,657 B1 6/2002 Eitzman
6,409,806 B1 6/2002 Jones
6,454,986 B1 9/2002 Eitzman
6,484,722 B2 11/2002 Bostock
RE37,974 E 2/2003 Bowers
6,568,392 B1 5/2003 Bostock
6,705,317 B2 3/2004 Castiglione
6,729,332 B1 5/2004 Castiglione
6,743,464 B1 6/2004 Insley
6,783,574 B1 8/2004 Angadjivand
6,824,718 B2 11/2004 Eitzman
6,843,248 B2 1/2005 Japuntich
6,854,463 B2 2/2005 Japuntich
6,883,518 B2 4/2005 Mittelstadt
6,923,182 B2 8/2005 Angadjivand
7,013,895 B2 3/2006 Martin
7,028,689 B2 4/2006 Martin
7,117,868 B1 10/2006 Japuntich
7,131,442 B1 11/2006 Kronzer
RE39,493 E 2/2007 Yuschak
7,171,967 B2 2/2007 Brunell
7,185,653 B2 3/2007 Lee
7,188,622 B2 3/2007 Martin
7,302,951 B2 12/2007 Mittelstadt
7,311,104 B2 12/2007 Japuntich
7,428,903 B1 9/2008 Japuntich
7,677,248 B2 3/2010 Gerson
D659,821 S 5/2012 Spoo
8,251,065 B2 8/2012 Kim
8,910,634 B2 * 12/2014 Lu ........................ A62B 23/025 128/206.13
9,603,395 B2 3/2017 Duffy
10,357,069 B2 * 7/2019 Tuan .................. A41D 13/1107
2001/0015205 A1 8/2001 Bostock
2003/0226563 A1 12/2003 Brunell
2004/0237964 A1 12/2004 Bostock
2005/0051172 A1 3/2005 Lee
2005/0098180 A1 5/2005 Lien
2007/0175477 A1 8/2007 Baggett
2008/0271739 A1 * 11/2008 Facer ................... A62B 18/025 128/206.21
2010/0154805 A1 6/2010 Duffy
2012/0000473 A1 1/2012 Shigematsu
2012/0097167 A1 4/2012 Ono
2013/0186414 A1 7/2013 Suzuki
2014/0034059 A1 2/2014 Yagi
2014/0041671 A1 2/2014 Kumar et al.
2014/0182601 A1 7/2014 Duffy
2014/0332012 A1 11/2014 Mekler
2015/0059771 A1 3/2015 Duffy
2016/0375276 A1 12/2016 Martin

FOREIGN PATENT DOCUMENTS

CN 202151127 2/2012
CN 202154081 3/2012
CN 202154082 3/2012
CN 202172883 3/2012
CN 202222476 5/2012
CN 202311284 7/2012
CN 202552239 11/2012
CN 202857909 4/2013
CN 103126128 6/2013
CN 203723481 7/2014
CN 203776201 8/2014
CN 204259885 4/2015
CN 204317569 5/2015
CN 104939373 9/2015
CN 204635140 9/2015
CN 105077760 11/2015
CN 204763517 11/2015
CN 104489970 3/2016
CN 205143564 4/2016
CN 205197073 5/2016
CN 205197077 5/2016
DE 102010062431 6/2012
EP 2486815 8/2012
EP 2486960 8/2012
EP 2589413 5/2013
GB 871661 6/1961
GB 978962 1/1965
JP 2011239871 12/2011
JP 3182684 4/2013
JP 3200050 9/2015
KR 20-0335486 12/2003
KR 20-0370341 12/2004
KR 20-0443652 10/2008
KR 20160026067 3/2016
KR 20-0484382 8/2017
RU 151559 4/2015
RU 154233 8/2015
RU 175021 U1 * 11/2017
WO WO 1996-28216 9/1996
WO WO 2006-034227 3/2006
WO WO 2009-109770 9/2009
WO WO 2010-018855 2/2010
WO WO 2014/143039 9/2014

(56) References Cited

FOREIGN PATENT DOCUMENTS

| | | | |
|---|---|---|---|
| WO | 2015031066 | A2 | 3/2015 |
| WO | 2017/066284 | A1 | 4/2017 |
| WO | WO 2020-053786 | | 3/2020 |

OTHER PUBLICATIONS

Wente, "Superfine Thermoplastic Fibers", Industrial and Engineering Chemistry, 1956, pp. 1342-1346.

International Search Report for PCT International Application No. PCT/IB 18/60663, mailed on Jun. 3, 2019, 4 pages.

* cited by examiner

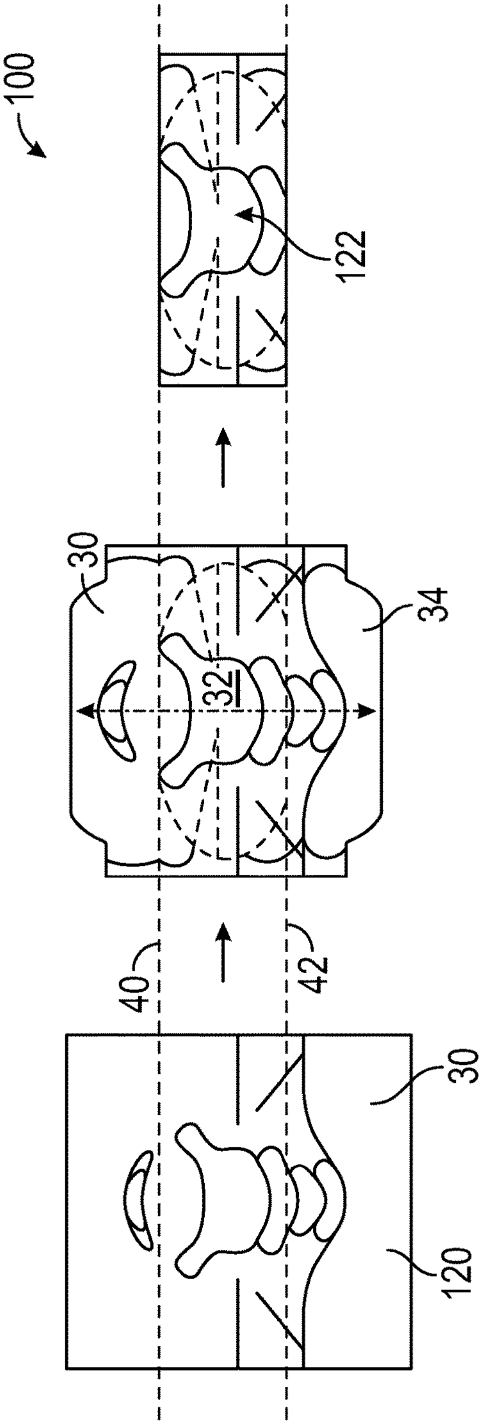
FIG. 8A
FIG. 8B
FIG. 8C
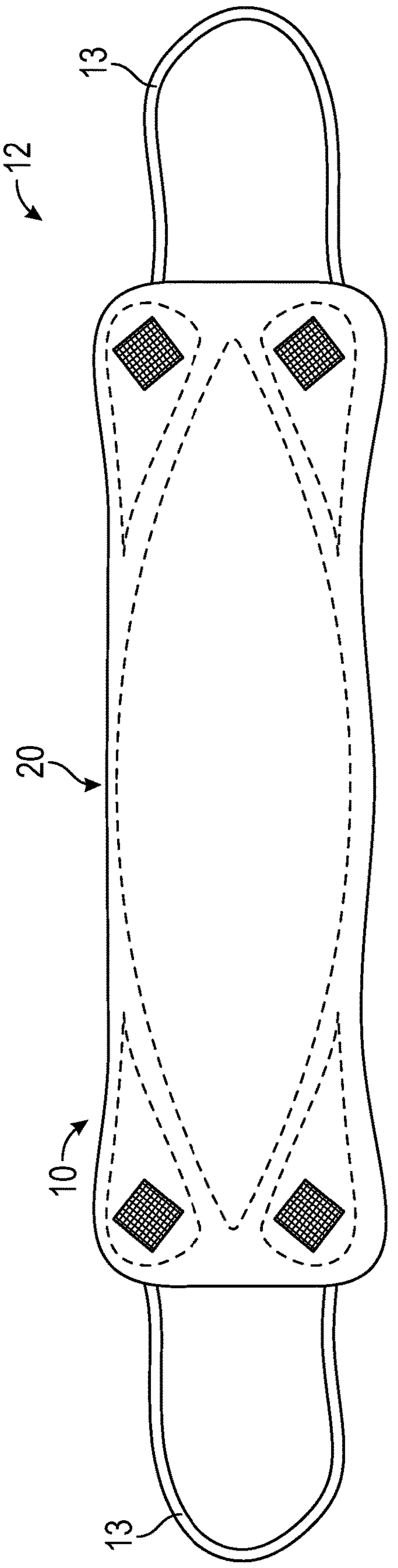
FIG. 8D

RESPIRATOR INCLUDING TRANSVERSELY-EXTENDING PLEAT AND METHOD OF FORMING SAME

CROSS REFERENCE TO RELATED APPLICATIONS

This application is a national stage filing under 35 U.S.C. 371 of PCT/IB2018/060663, filed Dec. 27, 2018, which claims the benefit of U.S. Provisional Application No. 62/613,245, filed Jan. 3, 2018, the disclosure of which is incorporated by reference in its/their entirety herein.

BACKGROUND

Respirators are commonly worn over a wearer's breathing passages for at least one of two common purposes: (1) to prevent impurities or contaminants from entering the wearer's respiratory system; and (2) to protect other wearers or things from being exposed to pathogens and other contaminants exhaled by the wearer. For the first purpose, the respirator is worn in an environment where the air contains particles that are harmful to the wearer, for example, in an auto body shop. For the second purpose, the respirator is worn in an environment where there is risk of contamination to other wearers or things, for example, in an operating room or clean room.

A variety of respirators have been designed to meet either (or both) of these purposes. Some respirators have been categorized as being "filtering face-pieces" because the mask body itself functions as the filtering mechanism. Unlike respirators that use rubber or elastomeric mask bodies in conjunction with attachable filter cartridges (see, e.g., U.S. Pat. RE39,493 to Yuschak et al.) or insert-molded filter elements (see, e.g., U.S. Pat. No. 4,790,306 to Braun), filtering face-piece respirators are designed to have the filter media cover much of the entire mask body so that there is no need for installing or replacing a filter cartridge. These filtering face-piece respirators commonly come in one of two configurations: molded respirators and flat-fold respirators.

Molded filtering face-piece respirators have regularly included non-woven webs of thermally-bonded fibers or open-work plastic meshes to provide the mask body its cup-shaped configuration. Molded respirators tend to maintain the same shape during both use and storage. These respirators cannot, therefore, be folded flat for storage and shipping. Examples of patents that disclose molded, filtering, face-piece respirators include U.S. Pat. No. 7,131,442 to Kronzer et al; U.S. Pat. Nos. 6,923,182 and 6,041,782 to Angadjivand et al.; U.S. Pat. No. 4,807,619 to Dyrud et al.; and U.S. Pat. No. 4,536,440 to Berg.

Flat-fold respirators can be folded flat for shipping and storage. They can also be opened into a cup-shaped configuration for use. Examples of flat-fold respirators are described, e.g., in U.S. Pat. Nos. 6,568,392 and 6,484,722 to Bostock et al.; and U.S. Pat. No. 6,394,090 to Chen. Some flat-fold respirators have been designed with weld lines, seams, and folds to help maintain their cup-shaped configuration during use. Stiffening members have also been incorporated into panels of the mask body (see, e.g., U.S. Patent Application Publication No. 2010/0154805 to Duffy et al. and U.S. Design Pat. No. 659,821 to Spoo et al.).

SUMMARY

In general, the present disclosure provides various embodiments of a filtering face-piece respirator and a method of forming such respirator. The filtering face-piece respirator can include a transversely-extending multiple-layer pleat that is disposed in a central panel of a mask body of the respirator. The pleat can be welded to itself at a first weld location disposed on a right side of the mask body and a second weld location disposed on a left side of the mask body.

In one aspect, the present disclosure provides a filtering face-piece respirator that includes a mask body and a harness connected to the mask body. The mask body includes a filtering structure having a central panel, an upper panel separated from the central panel by a first line of demarcation, and a lower panel separated from the central panel by a second line of demarcation. The mask body further includes a bisecting fold that is substantially vertical when viewed from a front of the filtering face-piece respirator when the respirator is oriented as in use on a wearer, where the substantially vertical bisecting fold extends through the upper panel, central panel, and lower panel of the mask body. In addition, the mask body includes a transversely-extending three-layer pleat disposed in the central panel of the filtering structure, where the transversely-extending three-layer pleat is formed in the mask body and is welded to itself at a first weld location disposed on a right side of the mask body and a second weld location disposed on a left side of the mask body.

In another aspect, the present disclosure provides a method that includes forming a mask body blank having a filtering structure; and forming a central panel, an upper panel, and a lower panel in the mask body blank by folding the mask body blank along a first line of demarcation and a second line of demarcation, where the first line of demarcation separates the upper panel and the central panel, and further where the second line of demarcation separates the lower panel and the central panel. The method further includes folding the central panel to form a three-layer transversely-extending pleat, and welding the transversely-extending pleat at a first weld location disposed on a right side of the mask body blank and a second weld location on a left side of the mask body blank.

GLOSSARY

"Clean air" means a volume of atmospheric ambient air that has been filtered to remove contaminants;

"contaminants" means particles (including dusts, mists, and fumes) and/or other substances that generally may not be considered to be particles (e.g., organic vapors, etc.) but which may be suspended in air;

"crosswise dimension" is the dimension that extends laterally across the respirator, from side-to-side when the respirator is viewed from the front;

"cup-shaped configuration" and variations thereof mean any vessel-type shape that is capable of adequately covering the nose and mouth of a wearer;

"dart" means a double-tapered region in the filtering structure of the mask body, the region having two fixed opposite ends and a center region having an adjustable width tapering to the fixed ends;

"exterior gas space" means the ambient atmospheric gas space into which exhaled gas enters after passing through and beyond the mask body and/or exhalation valve;

"exterior surface" means the surface of the mask body exposed to ambient atmospheric gas space when the mask body is positioned on the wearer's face;

"filtering face-piece" means that the mask body itself is designed to filter air that passes through it; there are no separately identifiable filter cartridges or insert-molded filter elements attached to or molded into the mask body to achieve this purpose;

"filter" or "filtration layer" means one or more layers of air-permeable material, which layer(s) is adapted for the primary purpose of removing contaminants (such as particles) from an air stream that passes through it;

"filter media" means an air-permeable structure that is designed to remove contaminants from air that passes through it;

"filtering structure" and "breathable filtering structure" each means a generally air-permeable construction that filters air;

"folded inwardly" means being bent back towards the part from which extends;

"harness" means a structure or combination of parts that assists in supporting the mask body on a wearer's face;

"interior gas space" means the space between a mask body and a wearer's face;

"interior surface" means the surface of the mask body closest to a wearer's face when the mask body is positioned on the wearer's face;

"line of demarcation" means a fold, seam, weld line, bond line, stitch line, hinge line, and/or any combination thereof;

"mask body" means an air-permeable structure that is designed to fit over the nose and mouth of a wearer and that helps define an interior gas space separated from an exterior gas space (including the seams and bonds that join layers and parts thereof together);

"nose clip" means a mechanical device (other than a nose foam) that is adapted for use on a mask body to improve the seal at least around a wearer's nose;

"perimeter" means the outer edge of the mask body that is disposed generally proximate to a wearer's face when the respirator is being donned by a wearer; a "perimeter segment" is a portion of the perimeter;

"pleat" means a portion of the filtering structure that is designed to be or is folded back upon itself;

"polymeric" and "plastic" each mean a material that mainly includes one or more polymers and that may contain other ingredients as well;

"respirator" means an air filtration device that is worn by a wearer to provide the wearer with clean air to breathe;

"transversely-extending" means extending generally in the crosswise dimension;

"vertical axis" means an axis that is parallel to a tangent to the Earth's surface; and "weld" means a line of demarcation formed, e.g., by ultrasonic welding, heat and pressure bonding, laser bonding, or any other suitable technique that bonds together one or more elements of the mask body.

All headings provided herein are for the convenience of the reader and should not be used to limit the meaning of any text that follows the heading, unless so specified.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein:

FIGS. 8A-F (collectively referred to as FIG. 8) are various schematic views of a method of forming the respirator of FIG. 1 and include the following views: FIG. 8A is a schematic front view of a mask body blank; FIG. 8B is a schematic front view of the mask body blank of FIG. 8A with one or more portions of the blank removed; FIG. 8C is a schematic plan view of the mask body blank of FIG. 8B folded along first and second lines of demarcation to form a mask body; FIG. 8D is a schematic plan view of the mask body of FIG. 8C with a harness connected to the mask body; FIG. 8E is a schematic view of the mask body of FIG. 8D folded along first and second fold lines to form a transversely-extending three-layer pleat; and FIG. 8F is a schematic side view of the mask body of FIG. 8E folded to form a substantially vertical bisecting fold.

DETAILED DESCRIPTION

Figure 1:
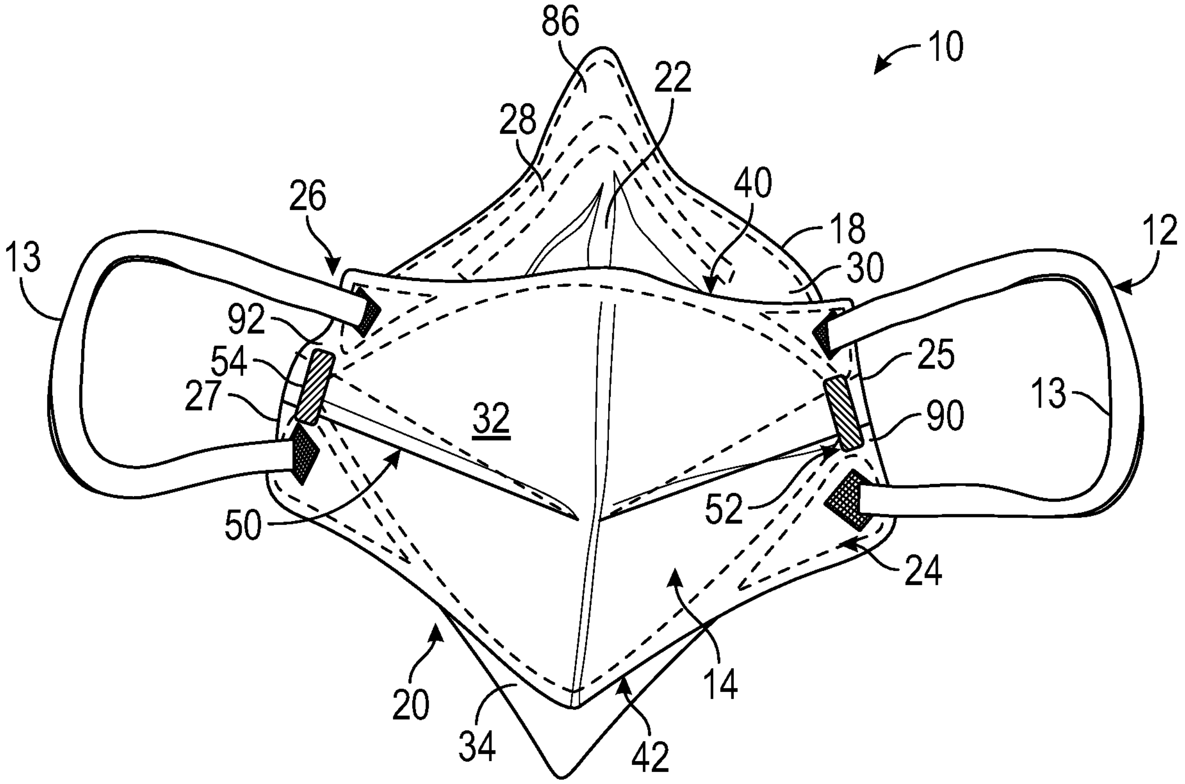
FIG. 1 is a schematic front perspective view of one embodiment of a respirator.

In general, the present disclosure provides various embodiments of a filtering face-piece respirator and a method of forming such respirator. The filtering face-piece respirator can include a transversely-extending multiple-layer pleat that is disposed in a central panel of a mask body of the respirator. The pleat can be welded to itself at a first weld location disposed on a right side of the mask body and a second weld location disposed on a left side of the mask body.

One or more embodiments of respirators described herein can provide various advantages over currently-available respirators. For example, the transversely-extending multiple-layer pleat can provide additional collapse resistance to the respirator by providing a beam effect across the central panel. The pleat can also increase a breathable surface area of the respirator when one or more portions of the pleat are unfolded. Further, one or more embodiments of respirators described herein can provide an audible pop or click sound when a portion or portions of the pleat are unfolded that can indicate to the wearer that the respirator is in a full, open configuration or condition.

FIGS. 1-7 are various views of one embodiment of a respirator 10. The respirator 10 can include any suitable respirator, e.g., a filtering face-piece respirator. The respirator 10 includes a mask body 20 and a harness 12 connected to the mask body. The mask body 20 includes a filtering structure 28 having a central panel 32, an upper panel 30 separated from the central panel by a first line of demarcation 40, and a lower panel 34 separated from the central panel by a second line of demarcation 42. The mask body 20 further includes a bisecting fold 22 that is substantially vertical when viewed from a front 14 of the filtering face-piece respirator 10 when the respirator is oriented as in use on a wearer. The substantially vertical bisecting fold 22 extends through the upper panel 30, central panel 32, and lower panel 34 of the mask body 20. The mask body 20 further includes a transversely-extending three-layer pleat 50 disposed in the central panel 32 of the filtering structure 28. The transversely-extending three-layer pleat 50 is formed in the mask body 20 and is welded to itself at a first weld location 52 disposed on a right side 24 of the mask body and a second weld location 54 disposed on a left side 26 of the mask body.

The mask body 20, which includes the front 14 (FIG. 1) and back 16 (FIG. 2), can also include any suitable mask body through which inhaled air passes before entering the wearer's respiratory system. The mask body 20 can remove contaminants from the ambient environment so that the wearer can breathe filtered air. Further, the mask body 20 may take a variety of different shapes and configurations and typically is adapted so that it fits against the wearer's face or within a support structure that contacts the face. In one or more embodiments, the mask body 20 can take a cup shape when the mask body is in an open configuration as shown in FIG. 1.

Figure 5:
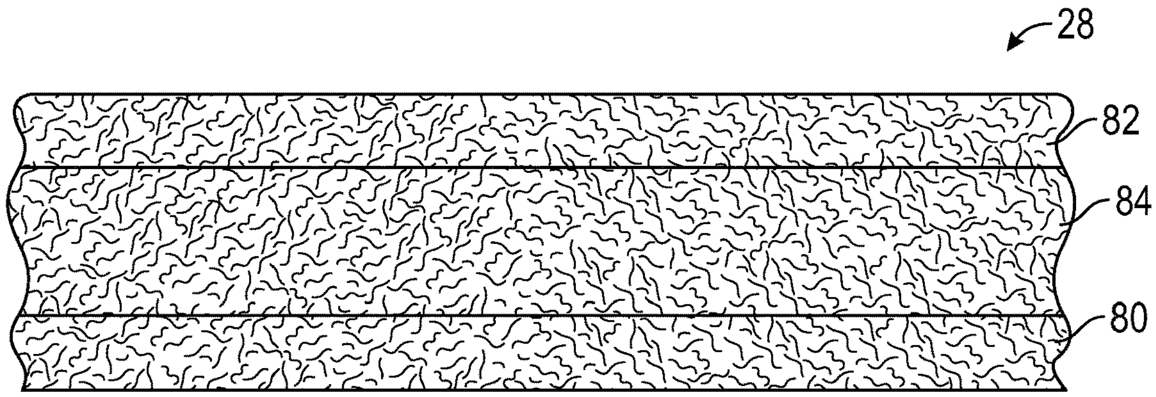
FIG. 5 is a schematic cross-section view of a portion of a filtering structure of the respirator of FIG. 1.

In one or more embodiments, the mask body 20 can include one or more cover layers or webs, e.g., a first cover web 80 and a second cover web 82 as shown in FIG. 5, which is a schematic cross-section view of a portion of the mask body. The mask body 20 also includes filter media 84 disposed between the first cover web 80 and the second cover web 82. In one or more embodiments, the mask body 20 can also include functional material (not shown) disposed in any suitable location or locations on or within the mask body. Further, the mask body 20 can include any suitable number of layers, e.g., two, three, four, five, or more.

The mask body 20 can also include one or more panels that are defined by one or more lines of demarcation. For example, the mask body 12 includes the upper panel 30, the central panel 32, and the lower panel 34. Each of the panels 30, 32, 34 can take any suitable shape or combination of shapes and have any suitable dimensions. Further, the mask body 20 can be adapted to engage a wearer's face at a perimeter 18. In one or more embodiments, two or more layers of the mask body 20 can be joined together at the perimeter 18, e.g., by welding, bonding, adhering, stitching, or any other suitable technique. Further, in one or more embodiments, the respirator 10 can include a nose clip 86 (FIG. 1) disposed in any suitable location on or within the mask body 20. In the embodiment illustrated in FIGS. 1-7, the nose clip 86 is disposed on or in the upper panel 30 of the mask body 20.

Figure 2:
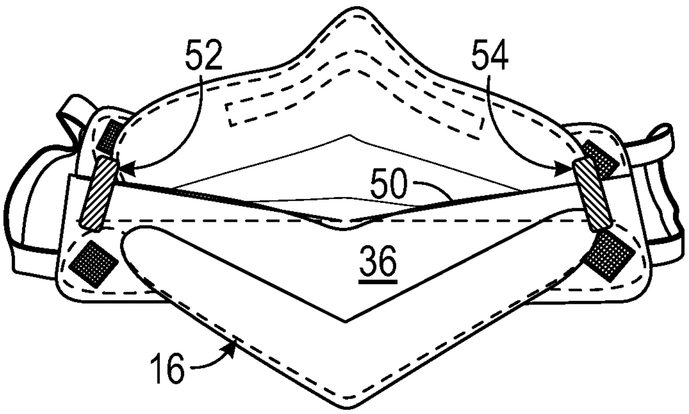
FIG. 2 is a schematic rear perspective view of the respirator of FIG. 1.

The central panel 32 of the mask body 20 is separated from the upper panel 30 and the lower panel 34 by the first and second lines of demarcation 40, 42. The upper and lower panels 30, 34 can each be folded inwards towards an inner surface 36 (FIG. 2) of the central panel 32 when the respirator 10 is being folded flat for storage, thereby placing the respirator in a closed condition. Further, the upper and lower panels 30, 34 can each be opened outwardly for placement of the respirator 10 on a wearer's face, thereby placing the respirator in an open condition (as shown in FIGS. 1-2). When the respirator 10 is manipulated from its open condition to its closed condition or vice versa, the upper and lower panels 30, 34 can at least partially rotate respectively about the first and second lines of demarcation 40, 42. In one or more embodiments, the first and second lines of demarcation 40, 42 can act as first and second hinges or axes, respectfully, for the upper and lower panels 30, 34.

The first and second lines of demarcation 40, 42 can be formed using any suitable technique or techniques, e.g., folding, welding (e.g., ultrasonic welding), application of pressure (with or without heat), adhering, stitching, and combinations thereof. Further, the first and second lines of demarcation 40, 42 can each be substantially continuous, discontinuous, straight, curvilinear, and combinations thereof. In one or more embodiments, one or both of the first and second lines of demarcation 40, 42 can include a weld line or seam.

Figure 3:
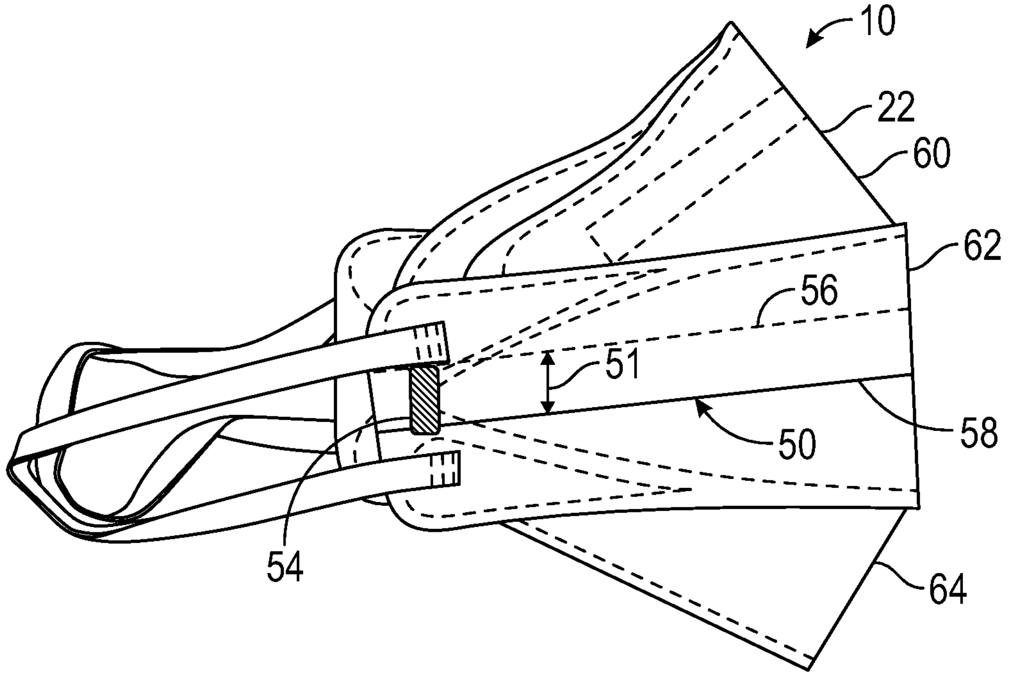
FIG. 3 is a schematic side perspective view of the respirator of FIG. 1 with a pleat of the mask body in a folded condition.

The mask body 20 also includes the bisecting fold 22 that is substantially vertical when viewed from the front 14 of the respirator 10 when the respirator is oriented as in use on a wearer as shown in FIG. 1. As used herein, the term "substantially vertical" means that the bisecting fold 22 forms an angle with a vertical axis of no greater than 8 degrees when donned by the wearer and the wearer is in an upright position. The substantially vertical bisecting fold 22 extends through the upper panel 30, central panel 32, and lower panel 34 of the mask body 20. As can be seen in FIG. 3, the mask body 20 is adapted to be folded flat for storage by folding the mask body along the vertical bisecting fold 22 such that an inner surface of the right side of the mask body is in contact with an inner surface of the left side of the mask body, with the upper and lower panels 30, 34 rotated away from the central panel 32 in the open configuration. The bisecting fold 22 can be formed using any suitable technique or techniques, e.g., folding, welding, other mechanical processing.

Disposed in the central panel 32 of the mask body 20 is the transversely-extending three- layer pleat 50. Although illustrated as including one pleat 50, the mask body 20 can include any suitable number of pleats, e.g., two, three, four, or more pleats. In one or more embodiments, the mask body 20 includes a second transversely-extending three-layer pleat (not shown) disposed in the central panel 32 of the filtering structure 28, where the second transversely-extending three- layer pleat is formed in the mask body and is welded to itself at a first weld location disposed on the right side 24 of the mask body and a second weld location disposed on the left side 26 of the mask body. Although depicted as including three layers, the pleats of the present disclosure can include any suitable number of layers, e.g., two, three, four, five, or more.

The pleat 50 is formed in the mask body 20 and is welded to itself at the first weld location 52 disposed on the right side 24 of the mask body and the second seal location 54 disposed on the left side 26 of the mask body. Any suitable technique or techniques can be utilized to form the first and second weld locations 52, 54, e.g., sealing, welding, bonding, etc.

The first and second seal locations 52, 54 can be disposed in any suitable portion or portions of the mask body 20. In one or more embodiments, each of the first seal location 52 and the second seal location 54 extends to at least 3 mm from each of a right side edge 25 and a left side edge 27 of the central panel 32 respectively. The pleat 50 can have any unsealed length between the first seal location 52 and the second seal location 54.

The pleat 50 can take any suitable shape and have any suitable dimensions. For example, the pleat 50 can have any suitable width 51 (FIG. 6) as measured in a direction parallel to the bisecting fold 22. In one or more embodiments, the pleat 50 can have a constant width 51 across the mask body 20 as measured in a direction parallel to the bisecting fold 22. In one or more embodiments, the pleat 50 can have a variable width across the mask body 20 as measured in a direction parallel to the bisecting fold 22 such that the pleat forms a dart. For example, the pleat 50 as shown in FIG. 3 has a constant width 51 along the length of the pleat. When the pleat 50 has a constant width 51 as shown in FIG. 3, the bisecting fold 22 includes three straight segments 60, 62, 64 when the mask body 20 is viewed in a plane that includes the bisecting fold and that bisects the mask body, i.e., the plane of FIG. 3. In other words, a profile shape of the mask body 20 has three straight segments 60, 62, 64 that form the bisecting fold 22.

Figure 4:
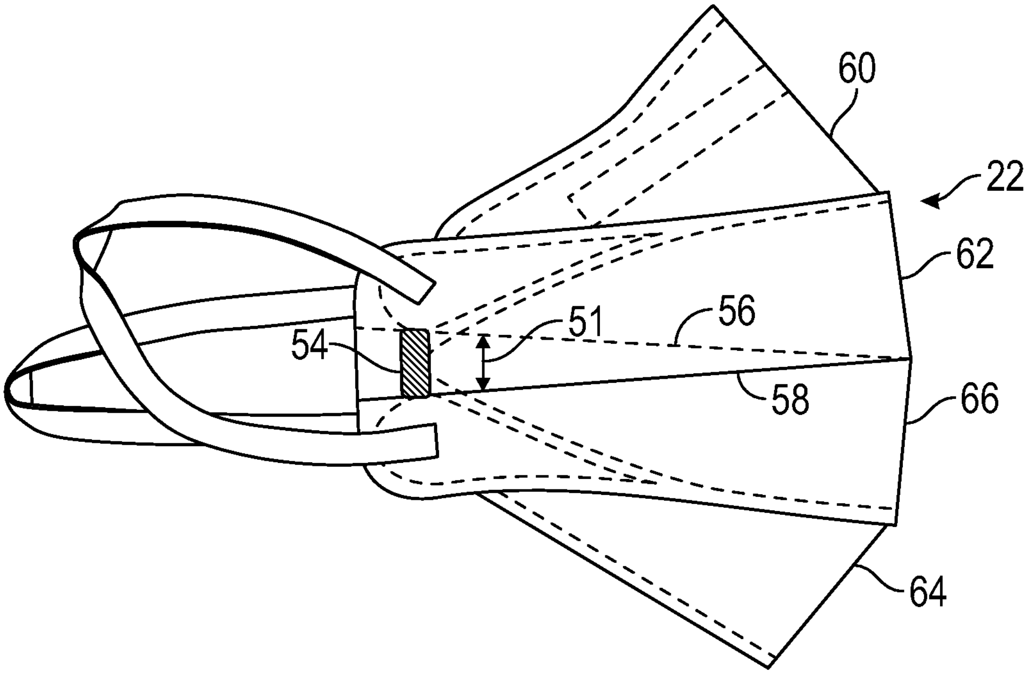
FIG. 4 is a schematic side perspective view of the respirator of FIG. 1 with a pleat of the mask body in a partially unfolded condition.

When the pleat 50 has a varying width 51 as shown in FIG. 4, the bisecting fold 22 includes four straight segments 60, 62, 64, and 66 when the mask body is viewed in the plane that includes the bisecting fold and that bisects the mask body, i.e., the plane of FIG. 4. In other words, a profile shape of the mask body 20 has four straight segments 60, 62, 64, 66 that form the bisecting fold 22. In one or more embodiments, the bisecting fold 22 can include four straight segments 60, 52, 64, and 66 without the mask body 20 including the pleat 50 such that the central panel 32 is not folded in a transversely-extended direction.

Figure 6:
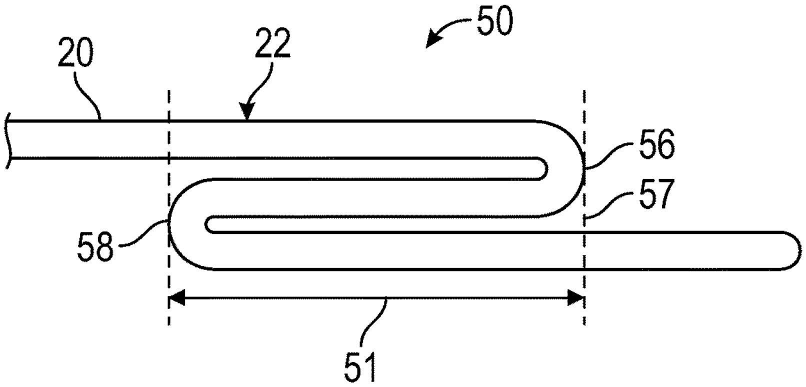
FIG. 6 is a schematic cross-section view of the pleat of the respirator of FIG. 1 with the pleat in the folded condition.
Figure 7:
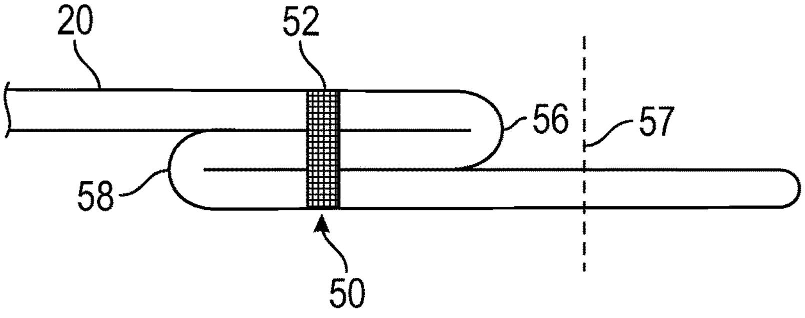
FIG. 7 is a schematic cross-section view of the pleat of the respirator of FIG. 1 with the pleat in the partially unfolded condition.

The width 51 of the pleat 50 can be varied by unfolding a portion or portions of the pleat between the first and second weld locations 52, 54 as shown in FIG. 4. When one or more portions of the pleat 50 are unfolded, the pleat can form a double-tapering dart configuration. As shown in FIG. 6, the pleat 50 includes first fold line 56 and a second fold line 58. The first and second fold lines 56, 58 are disposed on each of the right and left sides 24, 26 of the mask body 20. The pleat 50 is formed by folding the filtering structure 20 along the first and second fold lines 56, 58 on the right and left sides 24, 26 of the mask body 20. The pleat 50 also includes a first line 57 where the first fold line 56 terminates in relation to the filtering structure 28. When the pleat 50 is completely folded, i.e., in an unopened state, as shown in FIG. 3, the first fold line 56 overlaps the line 57. In some embodiment, when the pleat 50 is at least partially unfolded, i.e., in an at least partially opened state, as shown in FIG. 4, the first fold line 56 is not aligned with but is instead offset from the line 57 as shown in FIG. 7. In one or more embodiments, one or more portions of the pleat 50 (e.g., at the bisecting fold 22) can be fully opened so that no pleat remains in such portions.

The first and second fold lines 56, 58 can be formed using any suitable technique or techniques, e.g., folding, welding (e.g., ultrasonic welding), application of pressure (with or without heat), adhering, stitching, and combinations thereof. In one or more embodiments, the first and second fold lines 56, 58 include weld lines.

In one or more embodiments, the mask body 20 can also include a right tab 90 that extends from the right side edge 25 of the mask body 20, and a left tab 92 that extends from the left side edge 27 of the mask body. As used herein, the terms "right" and "left" refer to portions or elements of the respirator 10 as viewed by an observer when viewing the respirator as worn by a wearer. Further, the terms "upper" and "lower" refer to portions or elements of the respirator as viewed by the wearer when the respirator is positioned on the wearer's face. In one or more embodiments, the right and left tabs 90, 92 can provide a region for securement of the harness 12. One exemplary tab is described, e.g., in U.S. Pat. No. D449,377 to Henderson et al.

One or both of the right and left tabs 90, 92 can be integral with the mask body 20. For example, in one or more embodiments, one or both of the right and left tabs 90, 92 can be integral with the central panel 32 of the mask body 12. In one or more embodiments, one or both of the right and left tabs 90, 92 can be manufactured separately and then attached to the mask body 20 using any suitable technique or techniques. For example, in one or more embodiments, one or both of the right and left tabs 90, 92 can be manufactured separately and then attached to the central panel 32 of the mask body 20 using an adhesive. Further, one or both of the right and left tabs 90, 92 can include welds or bonds provided thereon to increase flange stiffness.

The harness 12, which can be any suitable harness and can include one or more straps or elastic bands 13. The straps or bands 13 of harness 12 can be attached to one or both of the right and left tabs 90, 92 using any suitable technique or techniques. For example, the straps or bands 13 can be stapled, welded, adhered, or otherwise secured to the mask body 20 at each opposing tabs 90, 92 such that the straps or bands can help to hold the mask body against the face of the wearer when the respirator 10 is being worn. An example of a compression element that could be used to fasten a harness to a mask body using ultrasonic welding is described, e.g., in U.S. Pat. Nos. 6,729,332 and 6,705,317 to Castiglione. The one or more straps or bands 13 can also be welded directly to the mask body 20 without using a separate attachment element. See, e.g., U.S. Pat. No. 6,332,465 to Xue et al. Examples of other harnesses that can be utilized are described, e.g., in U.S. Pat. No. 5,394,568 to Brostrom et al.; U.S. Pat. No. 5,237,986 to Seppala et al.; and in U.S. Pat. No. 5,481,763 to Brostrom et al.

The perimeter 18 (FIG. 1) of mask body 20 can include any suitable shape or shapes.

Further, in one or more embodiments, the perimeter 18 can include one or more concave portions as is further described, e.g., in U.S. Patent Publication No. 2008/0271739 to Facer et al. Although not shown, the respirator 10 can also include any suitable edge tape disposed along at least a portion of the perimeter 18 of the mask body 20.

The respirator 10 can also include one or more additional lines of demarcation (e.g., weld lines) disposed in any suitable location or locations on or in the mask body 20. The one or more additional weld lines can take any shape or shapes and have any suitable dimensions. In one or more embodiments, additional lines of demarcation such as weld lines can add to the structural stability of the mask body 20.

The filtering structure 28 of the mask body 20 can include any suitable layer or layers. For example, as illustrated in FIG. 5, the filtering structure 28 can include the first cover web 80, the second cover web 82, and filter media 84 disposed between the first cover web and the second cover web. While illustrated as including first and second cover webs 80, 82, the filtering structure 28 can include any suitable number of cover webs, e.g., one, two, three, or more cover webs. The first cover web 80 can be disposed nearest a face of a wearer when the respirator is donned, i.e., the first cover web can be considered an inner cover web, and the second cover web 82 can be considered an outer cover web. In one or more embodiments, the second cover web 82 can be considered an inner cover web and the first cover web 80 can be considered an outer cover web.

As mentioned herein, the filter media 84 can be disposed between the first cover web 80 and the second cover web 82. In one or more embodiments, the filter media 84 can extend to the perimeter 18 in any suitable portion or portions of the mask body 20. In one or more embodiments, the filter media 84 extends to the perimeter 18 along the entire length of the perimeter.

In general, the filtering structure 28 of the mask body 12 removes contaminants from the ambient air and may also act as a barrier layer that precludes liquid splashes from entering the mask interior. The second cover web 82 (i.e., when the second cover web is the outer cover web) can act to stop or slow any liquid splashes, and the filter media 84 can then contain them if there is penetration past the other layers. The filtering structure 28 of the mask body 20 can include a particle capture or gas and vapor type filter. The filtering structure 28 can include multiple layers of similar or dissimilar filter media and one or more cover webs as the application requires.

The first and second cover webs 80, 82 can be located on the outer sides of the filtering structure 28 to capture any fibers that could come loose therefrom. Typically, the cover webs 80, 82 are made from a selection of fibers that provide a comfortable feel, particularly the outer surface of the first cover web 80 that makes contact with the wearer's face (when the first cover web is the inner cover web). The constructions of various filter layers, shaping layers, and cover webs that may be used with a mask body used in a respirator 10 are described herein in more detail.

The first and second cover webs 80, 82 also may have filtering abilities. One or both of the first and second cover webs 80, 82 may also serve to make the respirator 10 more comfortable to wear. The cover webs 80, 82 may be made from nonwoven fibrous materials such as spun bonded fibers that contain, e.g., polyolefins, and polyesters. See, e.g., U.S. Pat. No. 6,041,782 to Angadjivand et al.; U.S. Pat. No. 4,807,619 to Dyrud et al.; and U.S. Pat. No. 4,536,440 to Berg. When a wearer inhales, air is drawn through the mask body, and airborne particles become trapped in the interstices between the fibers, particularly the fibers in the filter layer.

A typical cover web may be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material without requiring an adhesive between the layers. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 $g/m^2$ and having a fiber denier in the range 0.2 to 3.1 (with an average, measured over 100 fibers of about 0.8). Another suitable fiber is a polypropylene/polyethylene BMF (produced from a mixture comprising 85% of the resin "Escorene 3505G" and 15 percent of the ethylene/alpha-olefin copolymer "Exact 4023" also from Exxon Corporation) providing a basis weight of about 25 $g/m^2$ and having an average fiber denier of about 0.8. Suitable spunbond materials are available under the trade designations "Corosoft Plus 20," "Corosoft Classic 20" and "Corovin PP S 14," from Corovin GmbH of Peine, Germany, and a carded polypropylene/viscose material available, under the trade designation "370/15," from J. W. Suominen O Y of Nakila, Finland. Cover webs typically have very few fibers protruding from the web surface after processing and therefore have a smooth outer surface. Examples of cover webs that may be used in a respirator of the present disclosure are described, e.g., in U.S. Pat. No. 6,041,782 to Angadjivand; U.S. Pat. No. 6,123,077 to Bostock et al.; and PCT Publication No. WO 96/28216A to Bostock et al.

In one or more embodiments, one or both of the first cover web 80 and second cover web 82 can include a polymeric netting. Any suitable polymeric netting can be utilized for one or both cover webs. The netting may be made from a variety of polymeric materials. Polymers suitable for netting formation are thermoplastic materials. Examples of thermoplastic polymers that can be used to form polymer netting of the present disclosure include polyolefins (e.g., polypropylene and polyethylene), polyethylene-vinyl acetate (EVA), polyvinyl chloride, polystyrene, nylons, polyesters (e.g., polyethylene terephthalate), and elastomeric polymers, (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Blends of two or more materials also may be used in the manufacture of nettings. Examples of such blends include polypropylene/EVA and polyethylene/EVA. Polypropylene may be preferred for use in the polymeric netting since melt-blown fibers are regularly made from polypropylene. Use of similar polymers enables proper welding of the support structure to the filtering structure.

Filter media 84 that may be beneficially employed in the respirator 10 are generally low in pressure drop (e.g., less than about 195 to 295 Pascals at a face velocity of 13.8 centimeters per second) to minimize the breathing work of the mask wearer. Filter media 84 can also be flexible and have sufficient shear strength so that they generally retain their structure under the expected use conditions. Examples of particle capture filters include one or more webs of fine inorganic fibers (such as fiberglass) or polymeric synthetic fibers. Synthetic fiber webs may include electret-charged polymeric microfibers that are produced from processes such as meltblowing. Polyolefin microfibers formed from polypropylene that has been electrically charged can provide utility for particulate capture applications.

In one or more embodiments, the filter media 84 can include one or more filtration layers. Any suitable filtration layer or layers can be included in filtering structure 28. The filtration layer generally will remove a high percentage of particles and/or or other contaminants from the gaseous stream that passes through it. For fibrous filter layers, the fibers selected depend upon the kind of substance to be filtered and, in some embodiments, are chosen so that they do not become bonded together during the manufacturing operation. As indicated, the filtration layer may come in a variety of shapes and forms and typically has a thickness of about 0.2 millimeters (mm) to 1 centimeter (cm), more typically about 0.3 mm to 0.5 cm, and it could be a generally planar web or it could be corrugated to provide an expanded surface area. See, e.g., U.S. Pat. Nos. 5,804,295 and 5,656, 368 to Braun et al. The filter media 80 also may include multiple filtration layers.

Essentially any suitable material that is known (or later developed) for forming a filtration layer may be used as the filtering material. In one or more embodiments, webs of melt-blown fibers, such as those taught in Wente, Van A., *Superfine Thermoplastic Fibers,* 48 Indus. Eng. Chem., 1342 et seq. (1956), especially when in a persistent electrically charged (electret) form can be utilized (see, e.g., U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., *The Separation Of Airborne Dust Particles, Institution Of Mechanical Engineers*, London, Proceedings 1B, 1952. In one or more embodiments, the filtration layer can include one or more BMF webs that contain fibers formed from polypropylene, poly(4-methyl-1-pentene), and combinations thereof. Electrically charged fibrillated-film fibers as taught in U.S. Pat. Re. 31,285 to van Turnhout also may be suitable, as well as rosin-wool fibrous webs and webs of glass fibers or solution-blown, or electrostatically sprayed fibers, especially in microfiber form. Electric charge can be imparted to the fibers by contacting the fibers with water as disclosed in U.S. Pat. No. 6,824,718 to Eitzman et al.; U.S. Pat. No. 6,783,574 to Angadjivand et al.; U.S. Pat. No. 6,743,464 to Insley et al.; U.S. Pat. Nos. 6,454,986 and 6,406,657 to Eitzman et al.; and U.S. Pat. Nos. 6,375,886 and 5,496,507 to Angadjivand et al. Electric charge also may be imparted to the fibers by corona charging as disclosed in U.S. Patent No. 4,588,537 to Klasse et al., or by tribocharging as disclosed in U.S. Pat. No. 4,798,850 to Brown. Also, additives can be included in the fibers to enhance the filtration performance of webs produced through the hydrocharging process (see U.S. Pat. No. 5,908,598 to Rousseau et al.). Fluorine atoms, in particular, can be disposed at the surface of the fibers in the filter layer to improve filtration performance in an oily mist environment. See, e.g., U.S. Pat. Nos. 6,398,847 B1, 6,397,458 B1, and 6,409,806 B1 to Jones et al. Typical basis weights for electret BMF filtration layers are about 10 to 100 grams per square meter (g/m$^2$). When electrically charged according to techniques described in, e.g., the '507 Angadjivand et al. patent, and when including fluorine atoms as mentioned in the Jones et al. patents, the basis weight may be about 20 to 40 g/m$^2$ and about 10 to 30 g/m$^2$, respectively.

In one or more embodiments, the mask body 20 can also include functional material. The functional material can be disposed in any suitable location on or in the mask body 20. Further, the functional material can be disposed between one or more of the various layers of the mask body 20. The functional material can include any suitable material or materials that can absorb or remove one or more gases or particulates from air passing between the front 14 and the back 16 of the respirator 10. For example, in one or more embodiments, the functional material can include a layer that includes sorptive materials such as activated carbon. Further, separate particulate filtration layers may be used in conjunction with sorptive layers to provide filtration for both particulates and vapors. The sorbent component may be used for removing hazardous or odorous gases from the breathing air. Sorbents may include powders or granules that are bound in a filter layer by adhesives, binders, or fibrous structures. See, e.g., U.S. Pat. No. 6,234,171 to Springett et al. and U.S. Pat. No. 3,971,373 to Braun.

For example, a variety of active particles can be employed as sorbents. In one or more embodiments, the active particles are capable of absorbing or adsorbing gases, aerosols, or liquids expected to be present under the intended service conditions. The active particles can be in any useful form including beads, flakes, granules, fibers, or agglomerates. Exemplary active particles include activated carbon, alumina, and other metal oxides, clay, hopcalite, and other catalysts, ion exchange resins, molecular sieves, and other zeolites, silica, sodium bicarbonate, biocides, fungicides, and virucides. Mixtures of particles can be employed, e.g., to absorb mixtures of gases.

The respirator 10 can include any suitable additional elements or features that provide any desired functionality. For example, in one or more embodiments, the respirator 10 can include a nose foam (not shown) disposed in a nose region of the upper panel 30 of the mask body 20. The nose foam can include any suitable material or combination of materials that are adapted to engage a nose of a wearer and provide additional comfort to the wearer while providing a seal between the face and the mask body 20.

In one or more embodiments, an exhalation valve (not shown) may be attached to the mask body 20 to facilitate purging exhaled air from the interior gas space. The use of an exhalation valve may improve wearer comfort by rapidly removing the warm moist exhaled air from the mask interior. See, e.g., U.S. Pat. Nos. 7,188,622; 7,028,689, and 7,013, 895 to Martin et al.; U.S. Pat. Nos. 7,428,903; 7,311,104; 7,117,868; 6,854,463; 6,843,248; and 5,325,892 to Japuntich et al.; U.S. Pat. Nos. 7,302,951 and 6,883,518 to Mittelstadt et al.; and RE 37,974 to Bowers. Essentially any exhalation valve that provides a suitable pressure drop and that can be properly secured to the mask body 20 may be used in connection with the present disclosure to rapidly deliver exhaled air from the interior gas space to the exterior gas space. The exhalation valve can be disposed in any suitable location on or in the mask body 20.

Although not shown, the respirator 10 can also include an anti-fog film or films disposed on or within the mask body 20 in any suitable location to increase pressure drop through the mask body. For example, an anti-fog film can be disposed on or in the upper panel 30 to increase pressure drop through the upper panel any suitable amount, e.g., from 10 to 100%. Because exhaled air follows a path of least resistance, it will have a greater tendency to pass through the mask body 20 in regions where the anti-fog film is not disposed. There is, accordingly, less opportunity for a wearer's eyewear to become fogged by the exhaled air that passes from an interior gas space to an exterior gas space when the anti-fog film is disposed in the upper panel 30.

Figure 8E:
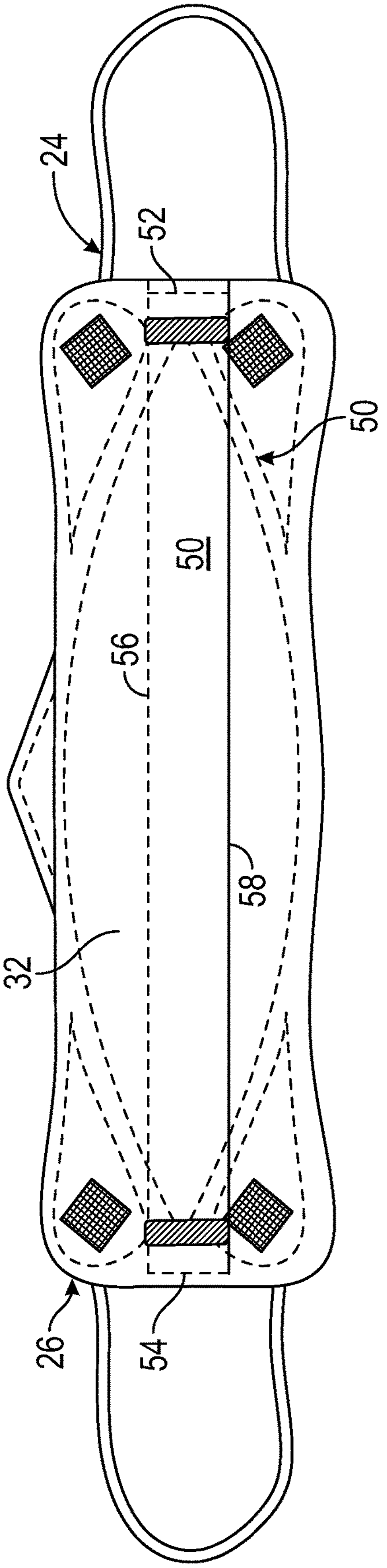

The various embodiments of respirators described herein can be manufactured using any suitable technique or techniques. For example, FIGS. 8A-F are various views of one embodiment of a method 100 of manufacturing the respirator 10. Although described in reference to respirator 10 of FIGS. 1-7, the method 100 can be utilized to manufacture any suitable respirator. The method 100 includes forming a mask body blank 120 that includes the filtering structure 28 as shown in FIG. 8A. Any suitable technique or techniques can be utilized to form the mask body blank 120. For example, in one or more embodiments, the various layers of the mask body 20 can be provided as individual material sheets. For example, the first cover web 80, the filtration layer 84, and the second cover web 82, can be brought together and plied face-to-face to form an extended length of filtering structure 28. These materials can be connected together using any suitable technique or techniques. For example, the filtering structure materials can be laminated together by an adhesive, thermal welding, or ultrasonic welding, and cut to a desired size as shown in FIG. 8B. Various welds or bonds 122 may also be formed on the extended length of the mask body blank 120 as shown in FIG. 8A.

The mask body blank 120 can then be folded and pleated using any suitable technique or techniques, and various welds and bonds can be made to form various features, such as first and second lines of demarcation 40, 42 and tabs 90, 92, on the flat mask body blank at 108 as shown in FIG. 8C to form the mask body 20. For example, the central panel 32, the upper panel 30, and the lower panel 34 can be formed in the mask body blank 120 by folding the mask body blank along the first line of demarcation 40 and the second line of demarcation 42 using any suitable technique or techniques. As mentioned herein, the first line of demarcation 40 separates the upper panel 30 and the central panel 32, and the second line of demarcation 42 separates the lower panel 34 and the central panel 32. In one or more embodiments, the straps 13 of the harness 12 can be connected to the mask body 20 using any suitable technique or techniques at any stage in the method 100. As shown in FIG. 8D, the straps 13 of the harness 12 can be attached to the mask body 20.

In FIG. 8E, the central panel 32 is folded along first and second fold lines 56, 58 using any suitable technique or techniques to form the transversely-extending pleat 50. The pleat 50 can be welded using any suitable technique or techniques at the first weld location 52 disposed on the right side 24 of the mask body 20, and the second weld location 54 on the left side 26 of the mask body.

Figure 8F:
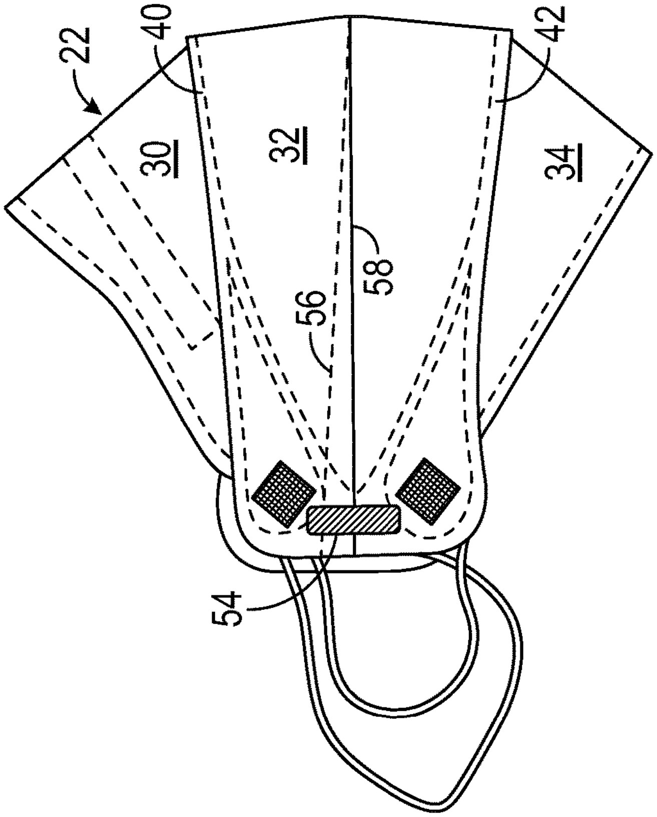

As shown in FIG. 8F, the method 100 can further include rotating the upper panel 30 about the first line of demarcation 40 away from the inner surface 36 of the central panel 32 and rotating the lower panel 34 about the second line of demarcation 42 away from the inner surface of the central panel such that the respirator 10 is in an open condition. Further, the method 100 can include folding the respirator 10 along the bisecting fold line 22 such that the respirator is in a folded condition.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A filtering face-piece respirator comprising a mask body and a harness connected to the mask body, wherein the mask body comprises:

a filtering structure comprising a central panel, an upper panel separated from the central panel by a first line of demarcation, and a lower panel separated from the central panel by a second line of demarcation;

a bisecting fold that is substantially vertical when viewed from a front of the filtering face-piece respirator when the respirator is oriented as in use on a wearer, wherein the substantially vertical bisecting fold extends through the upper panel, central panel, and lower panel of the mask body; and a transversely-extending three-layer pleat disposed in the central panel of the filtering structure, and comprising a width across the mask body as measured in a direction parallel to the bisecting fold, wherein the transversely-extending three-layer pleat is formed in the mask body and is sealed to itself by a first seal at a first seal location disposed on a right side of the mask body and by a second seal at a second seal location disposed on a left side of the mask body, wherein each of the first and second seals are singular discrete seals with an upper and lower portion, thereby the width is fixed at the first seal location and the second seal location, so that when in a folded condition, the width is constant from the first seal location and the second seal location to the bisecting fold, and when in an unfolded condition, the width gradually decreases from a first width spanning from the upper portion to the lower portion of each seal towards the bisecting fold.

2. The respirator of claim 1, wherein the filtering structure further comprises filter media disposed between first and second cover webs.

3. The respirator of claim 2, wherein a portion of the first cover web is welded to another portion of the first cover web such that the first seal forms a first weld, and wherein a portion of the second cover web is welded to another portion of the second cover web at the first weld.

4. The respirator of claim 3, wherein a portion of the first cover web is welded to another portion of the first cover web such that the second seal forms a second weld, and wherein a portion of the second cover web is welded to another portion of the second cover web at the second weld.

5. The respirator of claim 4, wherein the first weld extends through the pleat from the front to a back of the respirator, and the second weld extends through the pleat from the front to the back of the respirator.

6. The respirator of claim 1, wherein the mask body further comprises a right tab extending from a right side edge of the mask body and a left tab extending from a left side edge of the mask body.

7. The respirator of claim 6, wherein the first seal is a first weld and the second seal is a second weld, each weld extending to at least 3 mm from each of the right side edge and the left side edge of the central panel respectively.

8. The respirator of claim 6, wherein the right and left tabs are integral with at least one of the upper, central, and lower panels.

9. The respirator of claim 1, wherein the three-layer pleat comprises a first fold line and a second fold line disposed on each of the right and left sides of the mask body, wherein the three-layer pleat is formed by folding the filtering structure along the first and second fold lines on the right and left sides of the mask body.

10. The respirator of claim 9, wherein the first and second fold lines comprise weld lines.

11. The respirator of claim 1, further comprising one or more additional weld lines disposed in the filtering structure of the mask body.

12. The respirator of claim 11 wherein the filtering structure further comprises functional material disposed within the filtering structure.

13. The respirator of claim 1, wherein the width is a constant width across the mask body in the folded condition.

14. The respirator of claim 1, wherein the width is a variable width across the mask body in the unfolded condition that forms a dart.

15. The respirator of claim 1, wherein the first seal is a first weld and the second seal is a second weld.

16. The respirator of claim 1, further comprising an unwelded length of the transversely-extending pleat between the first seal location and the second seal location.

17. The respirator of claim 1, wherein at least one of the first and second lines of demarcation comprises a weld.

18. The respirator of claim 1, wherein the respirator is adapted to be folded flat for storage by folding the mask body along the substantially vertical bisecting fold such that an inner surface of the right side of the mask body is in contact with an inner surface of the left side of the mask body.

19. The respirator of claim 1, further comprising a nose clip disposed on or in the upper panel of the mask body.

20. The respirator of claim 1, further comprising an edge tape disposed along at least a portion of a perimeter of the mask body.

21. The respirator of claim 1, wherein the width extends between a first fold line and a second fold line.

22. The respirator of claim 1, wherein the transversely-extending three-layer pleat disposed in the central panel includes a first layer, a second layer and a third layer, wherein the second layer of the pleat overlaps with the third layer of the pleat.

23. The respirator of claim 1, wherein a first layer of the pleat is welded to a second layer of the pleat, and wherein the second layer of the pleat is welded with a third layer of the pleat at the first and second seal locations.

24. A method comprising:

forming a mask body blank comprising a filtering structure;

forming a central panel, an upper panel, and a lower panel in the mask body blank by folding the mask body blank along a first line of demarcation and a second line of demarcation, wherein the first line of demarcation separates the upper panel and the central panel, and further wherein the second line of demarcation separates the lower panel and the central panel;

folding the mask body blank along a bisecting fold that is substantially vertical when viewed from a front of the mask body blank when the mask body blank is oriented as in use on a wearer such that the mask body blank is in a folded condition, wherein the substantially vertical bisecting fold extends through the upper panel, central panel, and lower panel;

folding the central panel to form a three-layer transversely-extending pleat which comprises a width across the mask body as measured in a direction parallel to the bisecting fold; and sealing the transversely-extending pleat by a first seal at a first seal location disposed on a right side of the mask body blank and by a second seal at a second seal location on a left side of the mask body blank, wherein each of the first and second seals are singular discrete seals with an upper and lower portion, thereby the width is fixed at the first seal location and the second seal location, so that when in a folded condition, the width is constant from the first seal location and the second seal location to the bisecting fold, and when in an unfolded condition, the width gradually decreases from a first width spanning from the upper portion to the lower portion of each seal towards the bisecting fold.

25. The method of claim 24, wherein the sealing comprises welding a portion of a first cover web to another portion of the first cover web and welding a portion of a second cover web to another portion of the second cover web at the first seal location such that the first seal forms a first weld.

26. The method of claim 25, wherein the sealing comprises welding a portion of the first cover web to another portion of the first cover web and welding a portion of the second cover web to another portion of the second cover web at the second seal location such that the second seal forms a second weld.

27. The method of claim 24, further comprising rotating the upper panel about the first line of demarcation away from an inner surface of the central panel and rotating the lower panel about the second line of demarcation away from the inner surface of the central panel such that the respirator is in an open condition.

28. The method of claim 24, wherein the width extends between a first fold line and a second fold line.

29. The method of claim 24, wherein the sealing comprises welding a first weld through the pleat from the front to a back of the respirator, and welding a second weld through the pleat from the front to the back of the respirator to form the first and second seals, respectively.

30. The method of claim 24, further comprising folding the transversely-extending three-layer pleat disposed in the central panel to include a first layer, a second layer and a third layer, wherein the second layer of the pleat overlaps with the third layer of the pleat.

* * * * *